United States Patent
Taulbee et al.

(10) Patent No.: US 10,423,811 B2
(45) Date of Patent: Sep. 24, 2019

(54) GARMENT INCLUDING RFID READER

(71) Applicant: Walmart Apollo, LLC, Bentonville, AR (US)

(72) Inventors: Alvin S. Taulbee, Springdale, AR (US); Jeremy R. Tingler, Bentonville, AR (US); Steven J. Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/933,833

(22) Filed: Mar. 23, 2018

(65) Prior Publication Data

US 2018/0285609 A1 Oct. 4, 2018

Related U.S. Application Data

(60) Provisional application No. 62/478,078, filed on Mar. 29, 2017.

(51) Int. Cl.
*G06K 7/10* (2006.01)
*H04B 5/00* (2006.01)
*G06Q 10/08* (2012.01)

(52) U.S. Cl.
CPC ..... *G06K 7/10396* (2013.01); *G06K 7/10128* (2013.01); *G06Q 10/087* (2013.01); *H04B 5/0062* (2013.01)

(58) Field of Classification Search
CPC ................ G06K 7/10396; G06K 7/10128
USPC ....................................................... 340/10.1
See application file for complete search history.

(56) References Cited

U.S. PATENT DOCUMENTS

| | | | |
|---|---|---|---|
| 7,034,685 | B2 | 4/2006 | Fabre |
| 7,221,900 | B2 | 5/2007 | Reade |
| 7,242,293 | B2 | 7/2007 | Rea |
| 8,281,994 | B1 | 10/2012 | Wass |

(Continued)

FOREIGN PATENT DOCUMENTS

CN 105955510 9/2016

OTHER PUBLICATIONS

Honeywell; "8620 High Performance Ring Scanner"; published Jan. 2016, pp. 1-2.

(Continued)

*Primary Examiner* — Vernal U Brown
(74) *Attorney, Agent, or Firm* — Fitch, Even, Tabin & Flannery LLP

(57) ABSTRACT

In some embodiments, apparatuses and methods are provided herein useful to monitoring a plurality of RFID tags in a remote location. In some embodiments, a garment for monitoring a plurality of RFID tags in a remote location comprises a garment body, an RFID reader attached to the garment body, the RFID reader configured to read the plurality of RFID tags in the remote location, an antenna attached to the garment body, and a control circuit attached to the garment and configured to receive, from the RFID reader, one or more identifiers, wherein the one or more identifiers are associated with the plurality of RFID tags, generate, based on the one or more identifiers, emulated identifiers, determine that the garment is within a designated area separate from the remote location, and in response to determining that the garment is within the designated area, cause the emulated identifiers to be transmitted.

22 Claims, 3 Drawing Sheets

(56) References Cited

U.S. PATENT DOCUMENTS

| | | | |
|---|---|---|---|
| 8,482,412 B2 | 7/2013 | Majoros | |
| 8,674,810 B2* | 3/2014 | Uysal | G06K 7/0008 |
| | | | 340/10.4 |
| 9,213,874 B2 | 12/2015 | Burnside | |
| 2006/0044112 A1 | 3/2006 | Bridgelall | |
| 2006/0114104 A1* | 6/2006 | Scaramozzino | G01S 5/02 |
| | | | 340/10.2 |
| 2007/0080930 A1 | 4/2007 | Logan | |
| 2007/0274242 A1* | 11/2007 | Lamacraft | G06K 19/0723 |
| | | | 370/310 |
| 2010/0141385 A1* | 6/2010 | Shiau | H04B 5/0062 |
| | | | 340/10.1 |
| 2011/0241838 A1 | 10/2011 | Wischmeyer | |
| 2014/0009266 A1 | 1/2014 | Burnside | |
| 2018/0096238 A1* | 4/2018 | Buller | G06K 19/0723 |

OTHER PUBLICATIONS

PCT; PCT App. No. PCT/US2018/024275; International Search Report and Written Opinion dated Jun. 8, 2018.

* cited by examiner

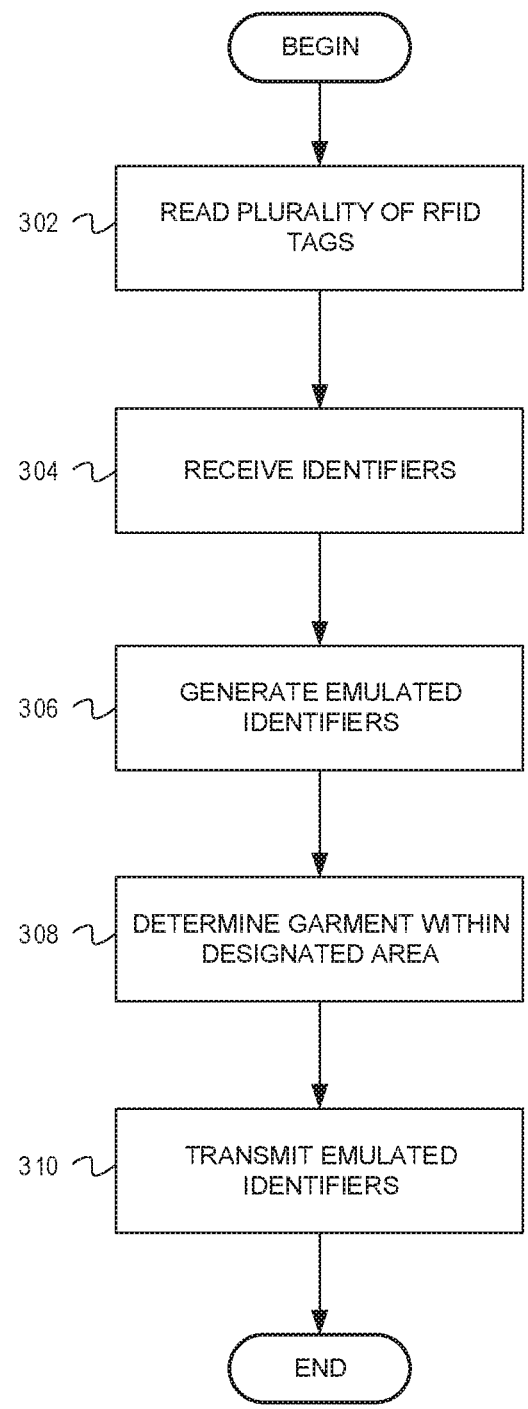

GARMENT INCLUDING RFID READER

CROSS-REFERENCE TO RELATED APPLICATIONS

This application claims the benefit of priority to U.S. Provisional Application No. 62/478,078, filed Mar. 29, 2017, which is incorporated by reference herein in its entirety.

TECHNICAL FIELD

This invention relates generally to radio frequency identification technology and, more specifically, inventory management using radio frequency identification technology.

BACKGROUND

In many industries, it is important to be able to quickly and accurately inventory items. In the past, employees were used to record and log inventory. Now, many industries are utilizing radio frequency identification (RFID) tags to reduce the time and cost associated with inventorying items. While RFID tags work well in many facilities, this technology is not always the ideal solution when products are stored in temporary facilities. For example, a retailer during peak seasons may store excess inventory in containers or trucks near the retail facility. To inventory these items, employees take an RFID reader to the containers or trucks to read the RFID tags. This however requires tasking an employee with inventory management duties for temporary facilities. Tasking an employee with inventory management duties increases costs for the retailer as the retailer must either reassign an employee to inventory management or add an additional employee to complete the task. Consequently, a need exists for systems and methods that can easily monitor inventory in temporary facilities without requiring the reassignment, or addition, of employees.

BRIEF DESCRIPTION OF THE DRAWINGS

Disclosed herein are embodiments of systems, apparatuses and methods pertaining to a garment for monitoring a plurality of RFID tags in a remote location. This description includes drawings, wherein:

FIG. 3 is a flow chart depicting example operations for reading RFID tags in a remote location, according to some embodiments.

Figure 1:
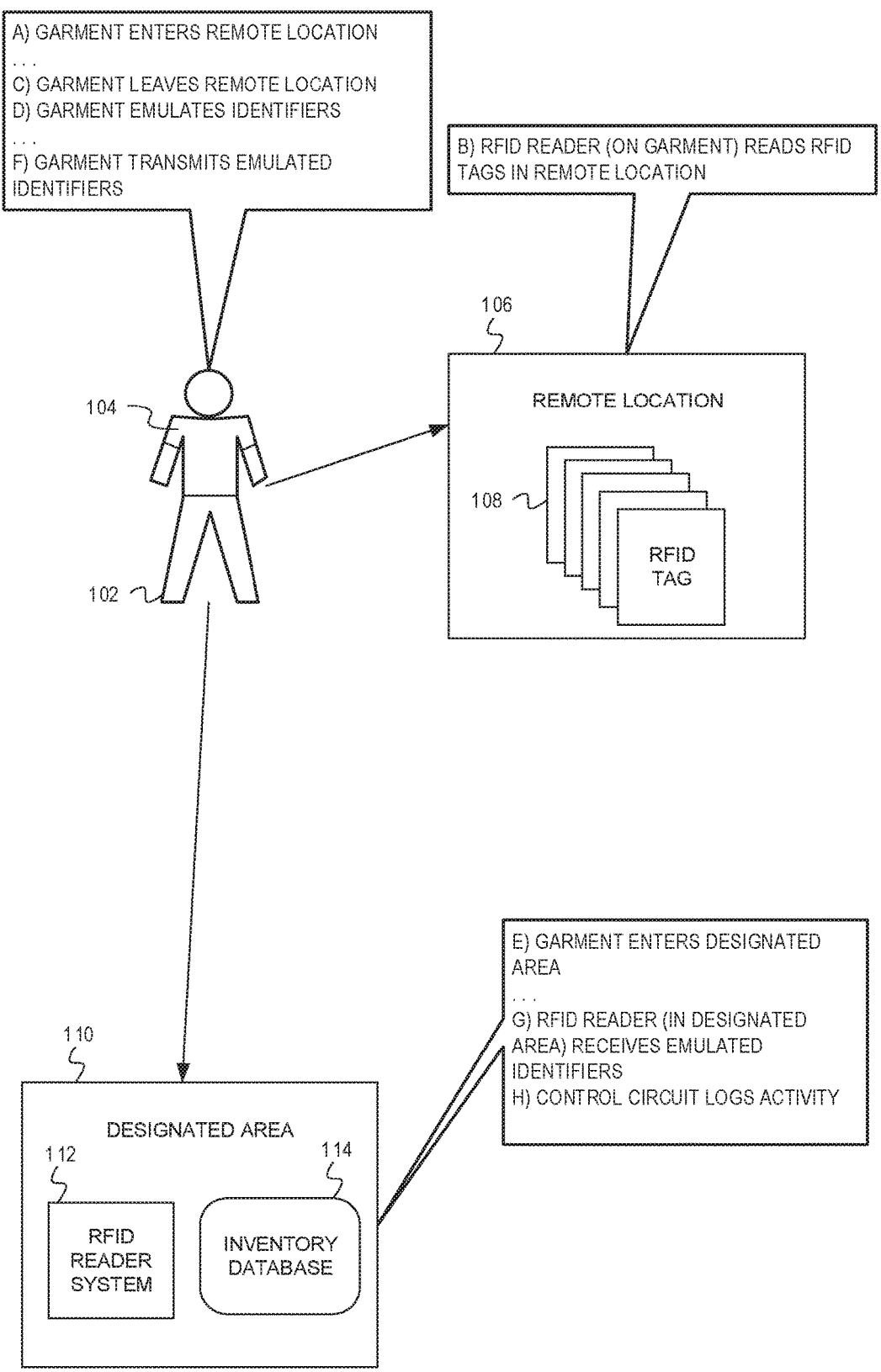
FIG. 1 depicts a system, including a garment 104 with an RFID reader to read RFID tags 108 in a remote location 106, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to monitoring a plurality of RFID tags in a remote location. In some embodiments, a garment for monitoring a plurality of RFID tags in a remote location comprises a garment body, an RFID reader attached to the garment body, the RFID reader configured to read the plurality of RFID tags in the remote location, an antenna, the antenna attached to the garment body, and a control circuit attached to the garment and communicatively coupled to the RFID reader and the antenna, the control circuit configured to receive, from the RFID reader, one or more identifiers, wherein the one or more identifiers are associated with the plurality of RFID tags in the remote location, generate, based on the one or more identifiers, emulated identifiers, determine that the garment is within a designated area separate from the remote location, and in response to determining that the garment is within the designated area, cause the emulated identifiers to be transmitted.

As previously discussed, RFID tags are a quick and accurate way to monitor inventory. RFID readers and the associated hardware can be installed in permanent or semi-permanent facilities. However, it may not be cost effective or practical to install RFID reader and the associated hardware in temporary or mobile facilities, such as containers or trucks. Currently, many businesses solve this problem by tasking an employee with visiting these remote locations (i.e., the temporary or mobile facilities). Typically, the employee takes a portable RFID reader to the remote location and reads the RFID tags on the items in the remote locations. When the employee returns, he or she will upload the data read from the tags into an inventory management system. While this approach accomplishes the goal of monitoring inventory in remote locations, it has many drawbacks. For example, if an employee is used to inventory the items, the inventory is only known at the time the employee visits the remote locations. Additionally, tasking an employee with inventory management either increases labor costs (i.e., through the addition of additional employee) or causes labor shortages elsewhere (i.e., through reassignment of an employee).

Embodiments of the systems, methods, and apparatuses described herein seek to eliminate or reduce these drawbacks by at least partially automating inventorying of remote locations. In one embodiment, a garment worn by an employee, such as a vest, includes an RFID reader and the hardware necessary (e.g., a control circuit) to read RFID tags in a remote location and emulate the RFID tags. When the employee returns to a designated area (e.g., a stockroom), the garment automatically transmits the emulated RFID tags, which are read by RFID readers in the designated area. Because this process is done automatically, anytime an employee enters the remote location, for example to retrieve an item, the inventory in the remote location can be monitored quickly and frequently. Additionally, the emulation of the RFID tags eliminates the need for the employee to upload information to an inventory management system. The discussion of FIG. 1 provides an overview of such a system.

FIG. 1 depicts a system including a garment 104 with an RFID reader to read RFID tags 108 in a remote location 106, according to some embodiments. The system depicted in FIG. 1 includes the garment 104, the remote location 106, the RFID tags 108, a designated area 110, an RFID reader system 112, and an inventory database 114. A person 102 is wearing the garment 104. While the garment 104 depicted in FIG. 1 is a shirt, the garment 104 can any suitable type of wearable article. For example, the garment 104 can be a vest, gloves, a hat, pants, shoes, a belt, a watch, glasses, a backpack, etc. Further, FIG. 1 depicts operations at stages A-H. The stages are examples and are not necessarily discrete occurrences over time (e.g., the operations of different stages may overlap). Additionally, FIG. 1 is an overview of example operations.

At Stage A, the person 102 enters the remote location 106 while wearing the garment 104. The garment 104 include the RFID reader and any other hardware and/or software necessary to read and emulate the RFID tags 108. For example, the garment 104 can include a control circuit, an antenna, a power supply, and memory. The remote location 106 can be any area or facility that does not have the equipment necessary to read RFID tags. As one example, the remote location 106 can be a container that houses additional items for a retail facility.

At Stage B, the RFID reader on the garment 104 reads the RFID tags 108 in the remote location 106. Continuing the retail example, the RFID tags 108 can be associated with the items, such as products, in the remote location 106. The RFID tags 108 can be passive or active. When the RFID reader reads the RFID tags 108, the RFID reader 108 receives identifiers from the RFID tags 108. The identifiers are associated with the RFID tags 108 and can identify the RFID tags 108 or items with which the RFID tags 108 are associated. The garment 104 stores the identifiers in the memory.

At Stage C, the garment leaves the remote location 106. That is, the person 102 wearing the garment 104 leaves the remote location 106.

At Stage D, the garment 104 emulates the identifiers. If the garment 104 includes a control circuit, the control circuit can emulate the identifiers. The resultant emulated identifiers correspond to the identifiers associated with the RFID tags 108 in the remote location 106.

At Stage E, the garment 104 enters the designated area 110. That is, the person 102 wearing the garment 104 enters the designated area 110. Continuing the retailer example, the designated area 110 can be a portion of the retail facility, such as a stockroom. In some embodiments, the garment 104 is aware of its location. For example, the garment 104 can identify when it has entered the designated area 110. This can be achieved via an RFID read by the garment 104 indicating that the garment 104 is in the designated area 110 or by triangulation (e.g., based on a GPS signal, Wi-Fi signal, etc.). In embodiments in which the garment 104 is aware of its location, the person 102 may not have to do anything for the garment 104 to transmit the emulated identifiers (other than entering the designated area 110). In embodiments in which the garment 104 is not capable of determining its location, or is unable to determine that it is in the designated area 110, the person can trigger transmission of the emulated identifiers via a button or other similar mechanism.

At Stage F, the garment 104 transmits the emulated identifiers. The emulated identifiers mimic the identifiers associated with the RFID tags 108 such that to the RFID reader system 112 in the designated area 110, it appears as if the RFID tags 108 are within the designated area 110. Because the garment 104 transmits the emulated identifiers, the person 102 is not required to actively upload data, such as the identifiers, to the inventory database 114. The garment 104 can transmit the emulated identifiers via the antenna, if so equipped.

At Stage G, the RFID reader system 112 receives the emulated identifiers. As previously discussed, because the identifiers are emulated, the RFID reader system 114 receives the identifiers, as emulated identifiers, as if the RFID tags 108 were within range of the RFID reader system 112. The RFID reader system 114 can be a single RFID reader in the designated area 110 or a number of RFID readers located throughout the designated area 110.

At Stage H, the inventory database 114 logs the activity. That is, the inventory database 114 logs the emulated identifiers to keep track of the items in the remote location 106.

Figure 2:
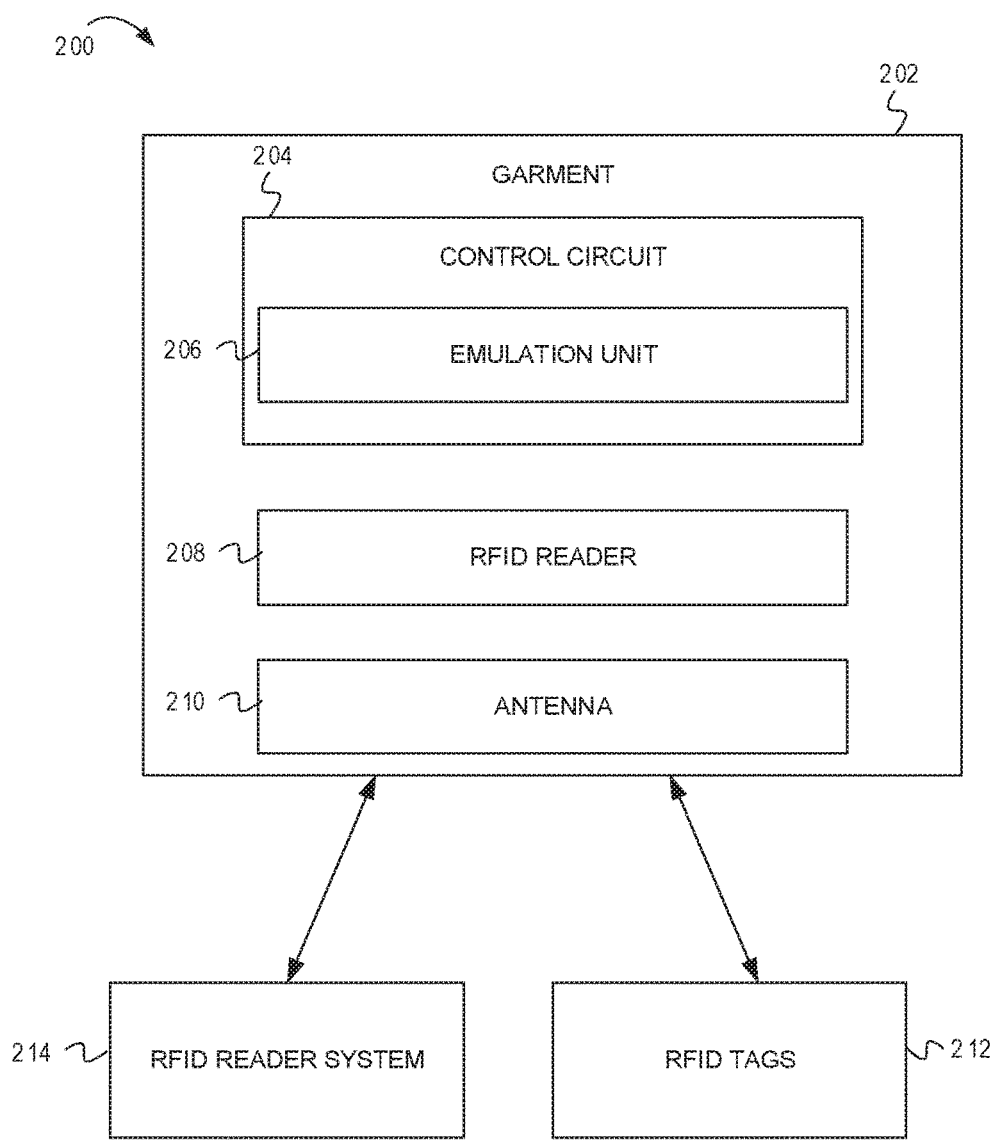
FIG. 2 is a block diagram of a system 200 for reading RFID tags 212 in a remote location, according to some embodiments.

While the discussion of FIG. 1 provides and overview of a system including a garment with an RFID reader to inventory items in a remote location, the discussion of FIG. 2 provides additional details of such a system.

FIG. 2 is a block diagram of a system 200 for reading RFID tags 212 in a remote location, according to some embodiments. The system 200 includes a garment 202, the RFID tags 212, and an RFID reader system 214. The garment 202 includes a control circuit 204, an RFID reader 208, and an antenna 210. When the garment 202 enters the remote location, the RFID reader 208 read the RFID tags 212 in the remote location via the antenna 210. In some embodiments, the garment 202 is aware of its location. In such embodiments, the garment 202 may be aware when it enters the remote area and automatically begin reading the RFID tags 212. The RFID reader 208 reads the RFID tags 212 by receiving, from the RFID tags 212, identifiers. The identifiers identify the RFID tags 212, for example, by identifying a product or item with which the RFID tag 212 is associated. After reading the RFID tags 212, the garment 202 stored the identifiers, for example, in memory. Alternatively, or additionally, the garment 202 can store the emulated identifiers (discussed in more detail below).

The control circuit 204 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 204 is configured (for example, by using corresponding programming as will be well understood by those skilled in the art) to carry out one or more of the steps, actions, and/or functions described herein.

By one optional approach the control circuit 204 operably couples to a memory. The memory may be integral to the control circuit 204 or can be physically discrete (in whole or in part) from the control circuit 204 as desired. This memory can also be local with respect to the control circuit 204 (where, for example, both share a common circuit board, chassis, power supply, and/or housing) or can be partially or wholly remote with respect to the control circuit 204 (where, for example, the memory is physically located in another facility, metropolitan area, or even country as compared to the control circuit 204).

This memory can serve, for example, to non-transitorily store the computer instructions that, when executed by the control circuit 204, cause the control circuit 204 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 204 includes an emulation unit 206. The emulation unit 206 emulates the identifiers read from the RFID tags 212 in the remote location. The emulated identifiers represent the identifiers. In some embodiments, the emulated identifiers represent the identifiers such that the emulated identifiers are indistinguishable, to an RFID reader system 214, from the identifiers. The garment 202 stores the emulated identifiers.

When the garment 202 enters a designated area, for example, a stockroom, the garment transmits the emulated identifiers. For example, the garment 202 transmits the emulated identifiers via the antenna 210. The garment 202 transmits the emulated identifiers to the RFID reader system 214. In some embodiments, the RFID reader system 214 is communicatively coupled to an inventory management system which logs the emulated identifiers.

While the discussion of FIG. 2 provides additional detail regarding a system including a garment with an RFID reader to inventory items in a remote location, the discussion of FIG. 3 describes example operations for inventorying items in a remote location with a garment including an RFID reader.

FIG. 3 is a flow chart depicting example operations for reading RFID tags in a remote location, according to some embodiments. The flow begins at block 302.

At block 302, a plurality of RFID tags are read. For example, an RFID reader included on a garment can read the RFID tags. The RFID tags are in a remote location. The remote location can be a temporary location. The RFID tags are associated with items or products in the remote location. The flow continues at block 304.

At block 304, identifiers are received. For example, the RFID reader can receive the identifiers from the RFID tags. The identifiers identify the items or products with which the RFID tags are associated the flow continues at block 306.

At block 306, emulated identifiers are generated. For example, a control circuit of the garment can emulate the emulated identifiers. The emulated identifiers represent the identifiers received from the RFID tags. The flow continues at block 308.

At block 308, it is determined that the garment is within a designated area. For example, the garment can determine that it is in the designated area. After reading the RFID tags in the remote area, the garment returns to the designated area. The designated area includes an RFID reader system to read RFID tags of items and products in the designated area as well as identifiers transmitted by the garment (discussed in more detail below). In some embodiments, the garment is aware of its location and determines that it is within the designated area automatically. Alternatively, or additionally, the garment determines that it is in the designated area based on user input. For example, the user can press a button to indicate that the garment is in the designated area, as well as prompt transmission of the emulated identifiers. The flow continues at block 310.

At block 310, the emulated identifiers are transmitted. For example, the garment can transmit the emulated identifiers to the RFID reader system. In some embodiments, the RFID system reads the emulated identifiers as if the RFID tags in the remote location were within the designated area.

Generally speaking, pursuant to various embodiments, systems, apparatuses, and methods are provided herein useful to monitoring a plurality of RFID tags in a remote location. In some embodiments, a garment for monitoring a plurality of RFID tags in a remote location comprises a garment body, an RFID reader attached to the garment body, the RFID reader configured to read the plurality of RFID tags in the remote location, an antenna, the antenna attached to the garment body, and a control circuit attached to the garment and communicatively coupled to the RFID reader and the antenna, the control circuit configured to receive, from the RFID reader, one or more identifiers, wherein the one or more identifiers are associated with the plurality of RFID tags in the remote location, generate, based on the one or more identifiers, emulated identifiers, determine that the garment is within a designated area separate from the remote location, and in response to determining that the garment is within the designated area, cause the emulated identifiers to be transmitted.

In some embodiments, an apparatus and a corresponding method performed by the apparatus comprises reading, by an RFID reader attached to a garment, the plurality of RFID tags in the remote location, receiving, at a control circuit attached to the garment from the RFID reader, one or more identifiers, wherein the one or more identifiers are associated with the plurality of RFID tags in the remote location, generating, by the control circuit based on the one or more identifiers, emulated identifiers, determining that the garment is within a designated area separate from the remote location, and in response to determining that the garment is within the designated area, transmitting the emulated identifiers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A garment for monitoring a plurality of radio frequency identification (RFID) tags in a remote location, the garment comprising:
   a garment body;
   an RFID reader attached to the garment body, the RFID reader configured to read the plurality of RFID tags in the remote location;
   an antenna, the antenna attached to the garment body; and
   a control circuit attached to the garment and communicatively coupled to the RFID reader and the antenna, the control circuit configured to:
      receive, from the RFID reader, one or more identifiers, wherein the one or more identifiers are associated with the plurality of RFID tags in the remote location;
      generate, based on the one or more identifiers, emulated identifiers, wherein the emulated identifiers are representative of the one or more identifiers;
      determine, without input from a person wearing the garment, that the garment is within a designated area separate from the remote location; and in response to determining that the garment is within the designated area and without input from the person wearing the garment, cause the emulated identifiers to be transmitted to a second RFID reader, wherein the second RFID reader is located within the designated area.

2. The garment of claim 1, the garment further comprising:
one or more programmable RFID tags;
wherein the control circuit is further configured to:
program the one or more programmable RFID tags based on the emulated identifiers.

3. The garment of claim 2, the control circuit further configured to:
after transmission of the emulated identifiers, cause the one or more programmable RFID tags to be formatted.

4. The garment of claim 1, wherein the control circuit causes the emulated identifiers to be transmitted by transmitting the emulated identifiers via the antenna.

5. The garment of claim 1, wherein the garment is one or more of a vest, a shirt, gloves, a hat, pants, shoes, a belt, a watch, and glasses.

6. The garment of claim 1, wherein the control circuit determines that the garment is within the designated area based on detection of an RFID field.

7. The garment of claim 1, wherein the control circuit determines that the garment is within the designated area based on the RFID reader detected detecting a predetermined RFID tag.

8. The garment of claim 1, wherein the remote location includes an RFID tag identifying the remote location, wherein the control circuit is further configured to:
associate each of the emulated identifiers with the remote location based on the RFID tag identifying the remote location.

9. The garment of claim 1, wherein the garment includes a power source, wherein the power supply includes one or more of a battery, a capacitor, and a solar cell.

10. The garment of claim 1, wherein the emulated identifiers include information in addition to the one or more identifiers.

11. A method for monitoring a plurality of radio frequency identifications (RFID) tags in a remote location, the method comprising:
reading, by an RFID reader attached to a garment, the plurality of RFID tags in the remote location;
receiving, at a control circuit attached to the garment from the RFID reader, one or more identifiers, wherein the one or more identifiers are associated with the plurality of RFID tags in the remote location;
generating, by the control circuit based on the one or more identifiers, emulated identifiers, wherein the emulated identifiers are representative of the one or more identifiers;
determining, without input from a person wearing the garment, that the garment is within a designated area separate from the remote location; and
in response to determining that the garment is within the designated area and without input from the person wearing the garment, transmitting the emulated identifiers to a second RID reader, wherein the second RFID reader is located within the designated area.

12. The method of claim 11, further comprising:
programming, based on the emulated identifiers, one or more programmable RFID tags, wherein the one or more programmable RFID tags are mounted on the garment.

13. The method of claim 12, further comprising:
after transmitting the emulated identifiers, causing the one or more programmable RFID tags to be formatted.

14. The method of claim 11, wherein the transmitting the emulated identifiers comprises transmitting the emulated identifiers via the antenna.

15. The method of claim 11, wherein the garment is one or more of a vest, a shirt, gloves, a hat, pants, shoes, a belt, a watch, and glasses.

16. The method of claim 11, wherein the determining that the garment is within the designated area is based on detecting an RFID field.

17. The method of claim 11, wherein the determining that the garment is within the designated area comprises the RFID reader reading a predetermined RFID tag.

18. The method of claim 11, wherein the remote location includes an RFID tag identifying the remote location, the method further comprising:
associating each of the emulated identifiers with the remote location based on the RFID tag identifying the remote location.

19. The method of claim 11, wherein the garment includes a power source, and wherein the power source includes one or more of a battery, a capacitor, and a solar cell.

20. The method of claim 11, wherein the emulated identifiers include information in addition to the one or more identifiers.

21. The garment for monitoring a plurality of radio frequency identification (RFID) tags in a remote location of claim 1, wherein the emulated identifiers mimic the one or more identifiers.

22. The method for monitoring a plurality of radio frequency identifications (RFID) tags in a remote location of claim 11, wherein the emulated identifiers mimic the one or more identifiers.

* * * * *

UNITED STATES PATENT AND TRADEMARK OFFICE
CERTIFICATE OF CORRECTION

PATENT NO. : 10,423,811 B2
APPLICATION NO. : 15/933833
DATED : September 24, 2019
INVENTOR(S) : Alvin S. Taulbee et al.

Page 1 of 1

It is certified that error appears in the above-identified patent and that said Letters Patent is hereby corrected as shown below:

In the Claims

Column 7, Line 29, Claim 7, after "reader" delete "detected".

Column 8, Line 11, Claim 11, delete "RID" and insert -- RFID --, therefor.

Signed and Sealed this
Eleventh Day of February, 2020

Andrei Iancu
*Director of the United States Patent and Trademark Office*